Aug. 14, 1962 M. OLESKOW 3,049,144
CONTROL VALVE FOR WATER SOFTENERS
Filed Sept. 10, 1959 4 Sheets-Sheet 1
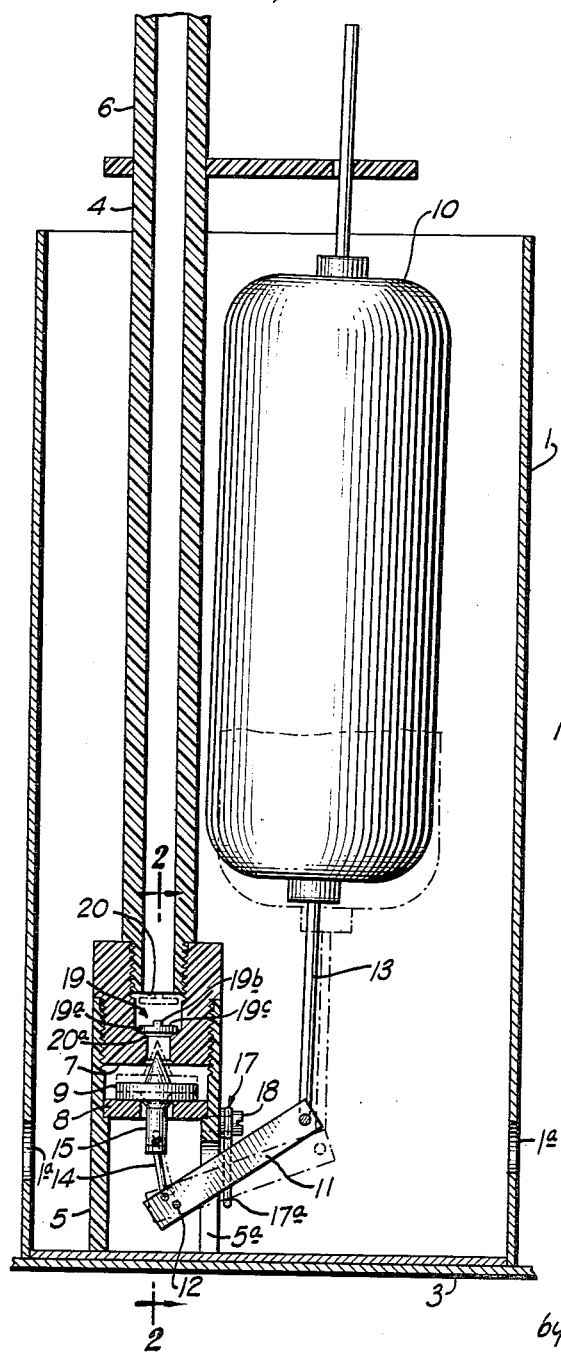
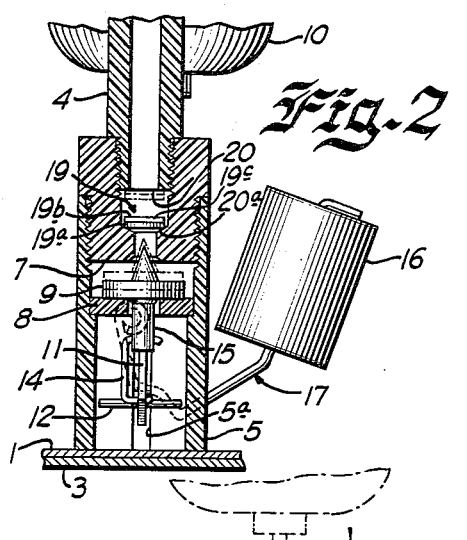
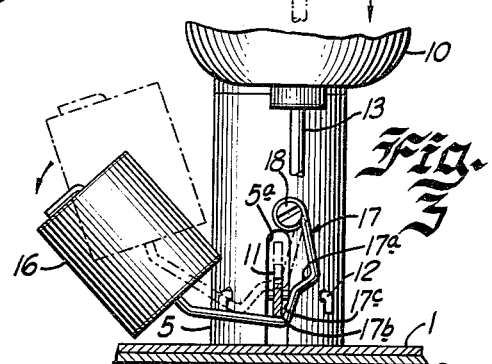
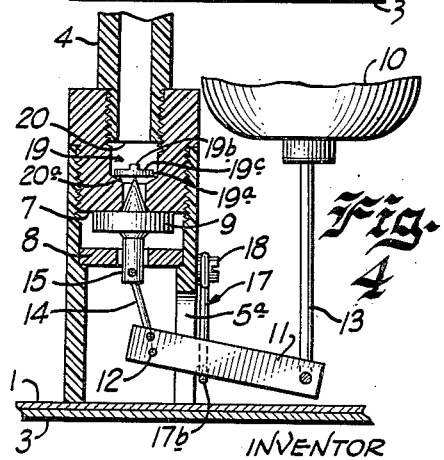
INVENTOR
MATHEW OLESKOW
by
Mason, Kolehmainen, Rathburn and Wyss.
ATTORNEYS.

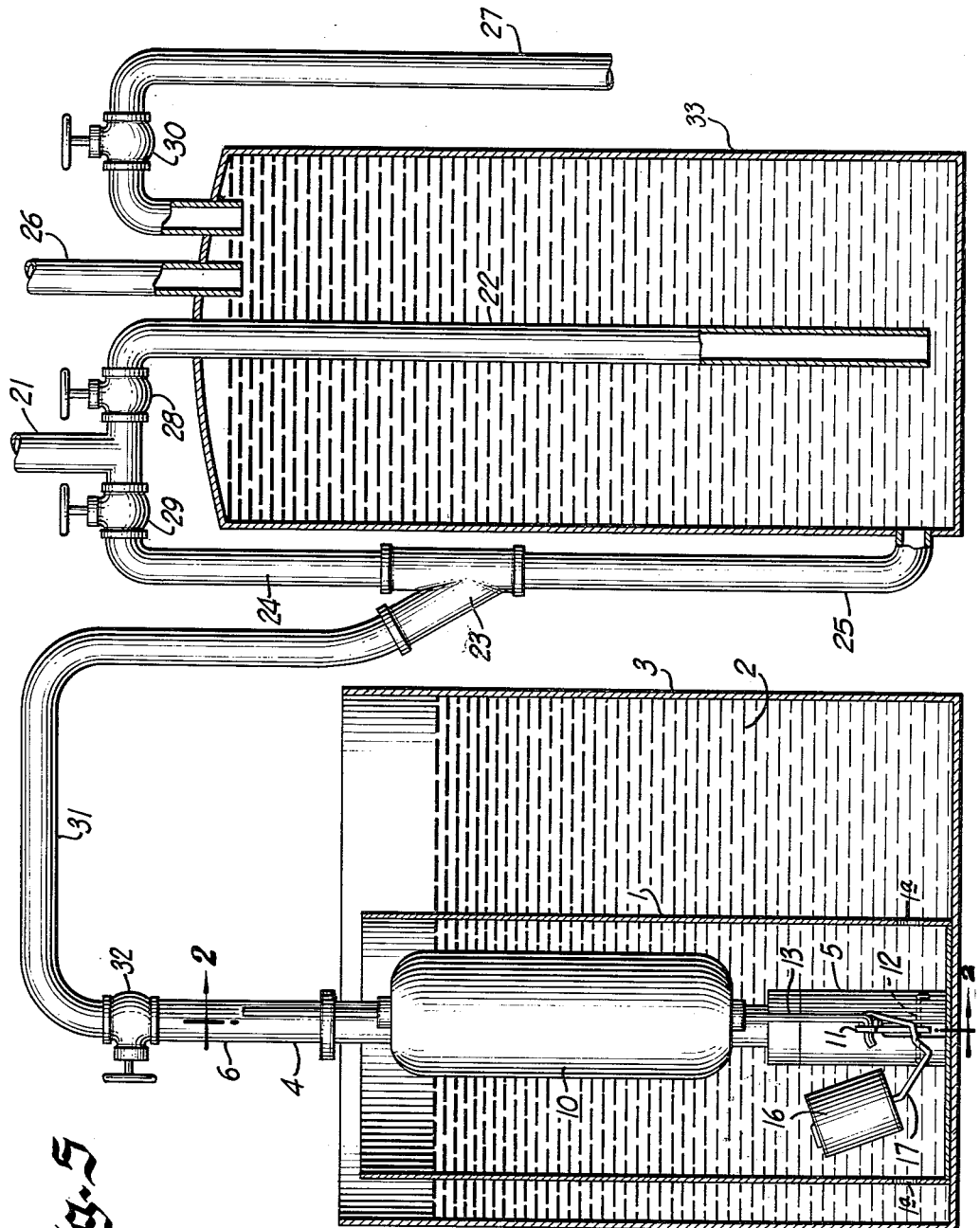

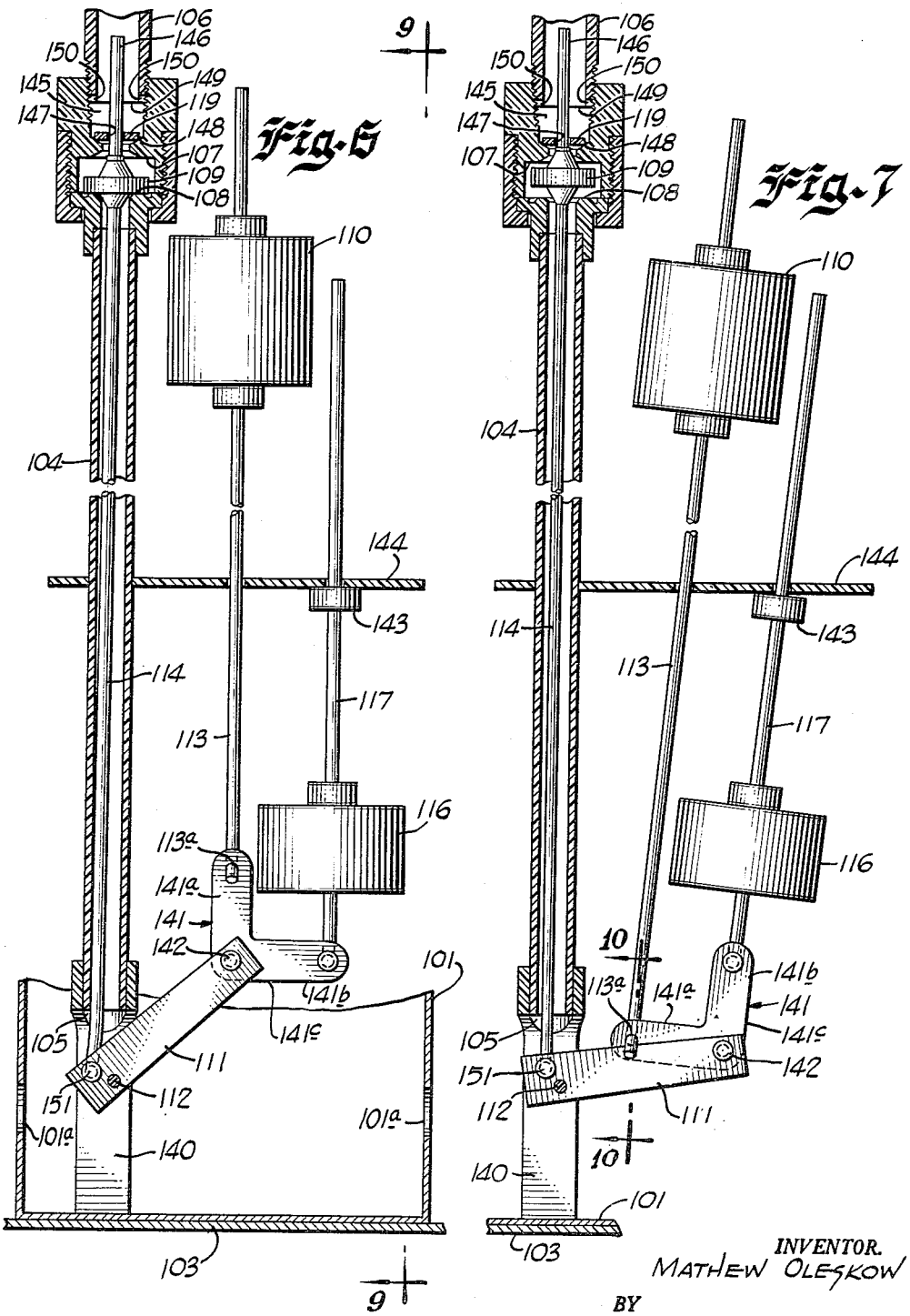

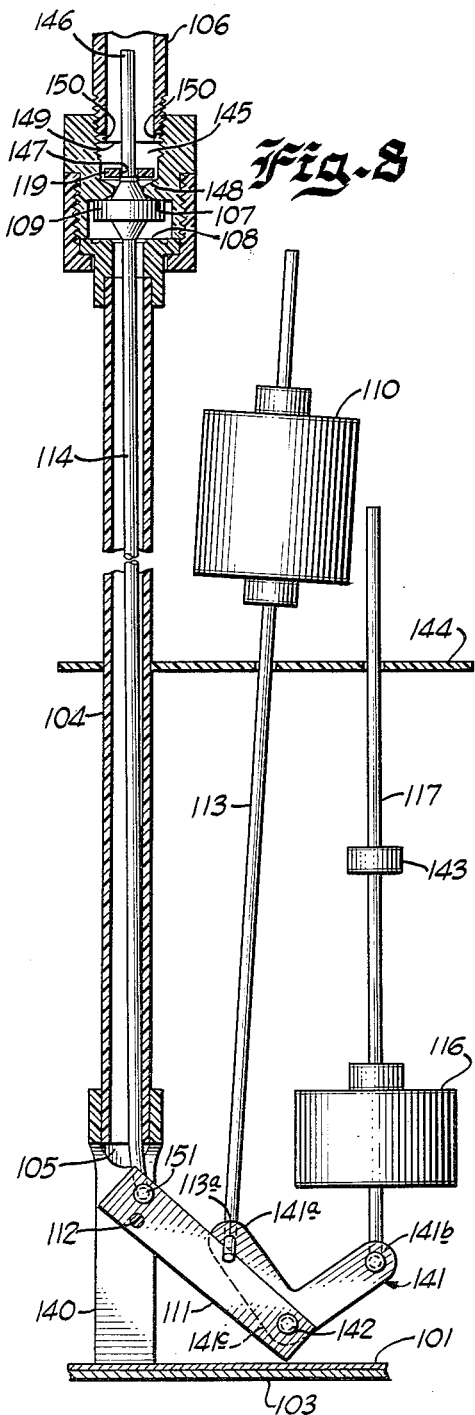
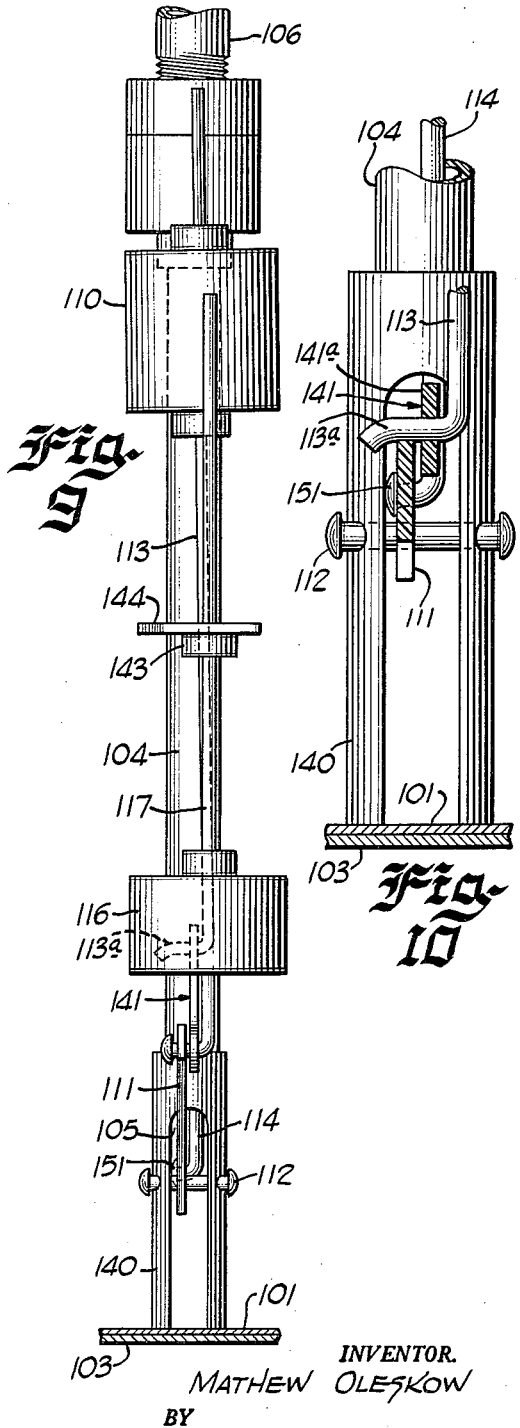

United States Patent Office 3,049,144
Patented Aug. 14, 1962

3,049,144
CONTROL VALVE FOR WATER SOFTENERS
Mathew Oleskow, 5453 Canfield Road, Chicago, Ill.
Filed Sept. 10, 1959, Ser. No. 839,203
1 Claim. (Cl. 137—391)

This invention relates generally to improvements in float valves, and is more particularly concerned with improvements in a float valve for use in water softener systems to control the flow of water into and the flow of brine solution out of a regeneration tank during the regeneration of the ion exchange material of the system. The valve of the present invention may be used to control the regenerating fluid in either a manual regeneration type or an automatic regenerating water softening system.

It is accordingly one of the objects of this invention to provide an improved apparatus for controlling the flow of regenerating fluid in a water softening system.

A further and more specific object of the present invention is to provide a valve of the character described above wherein, during regeneration, the valve remains fully open to permit flow of brine solution out of the regeneration tank until the level of the fluid in the tank reaches a predetermined low level whereupon the valve closes firmly and positively.

Another object of the invention is to provide a valve of the type described wherein the valve closes automatically when the level of brine solution in the tank reaches a low level which is, nevertheless, sufficiently high to prevent entry into the valve of debris floating on the solution within the tank.

The invention will best be understood by reference to the following description of an illustrative embodiment thereof, when taken together with the accompanying drawings, in which:

FIG. 1 is an elevational view, partly in section, illustrating a valve characterized by the features of the present invention with the value being shown in one of its operating positions;

FIG. 2 is a side elevational view of the valve in the position illustrated in FIG. 1;

FIG. 3 is a side view of the valve illustrated in FIG. 1 but shows the valve in another position;

FIG. 4 is a front sectional view of the valve in the position illustrated in FIG. 3;

FIG. 5 illustrates a typical water softening system employing the valve of the present invention;

FIG. 6 is an elevational view, partly in section, illustrating another embodiment of a valve characterized by the features of the present invention with the valve being shown in one of its operating positions;

FIG. 7 is an elevational view of the embodiment of the valve illustrated in FIG. 6 and shown in another of its operating positions;

FIG. 8 is an elevational view illustrating the valve of FIG. 6 in yet another of its operating positions;

FIG. 9 is a side elevational view of the valve embodied in FIG. 6 and illustrated in the operating position shown in FIG. 6, and FIG. 10 is a partial elevational view of the valve embodied in FIG. 6 shown in the position of FIG. 7.

Briefly stated, according to the invention the new and improved apparatus for controlling the flow of liquid into and out of the brine tank of a water softening system during the regeneration of the ion exchange material includes a valve conduit in the tank which communicates at its lower end with the brine and which has its upper end connected to a brine conduit. The valve conduit has a pair of confronting vertically spaced upper and lower valve seats with a valve element disposed between and alternately engageable with the seats. A first float in the tank is connected to the valve through a linkage constructed and arranged to raise the valve against the upper seat when the float is in a fully lowered position and to lower the valve against the lower seat when the float is buoyed upwardly. A second normally submerged float in the tank is connected to prevent full downward movement of the first float until the brine in the tank reaches a predetermined selected low level, thereby to hold the valve in an intermediate position between the upper and lower seats.

Referring to the embodiment of FIGS. 1 to 4, there is illustrated the new and novel valve apparatus according to the instant invention. The valve apparatus is disposed within a valve chamber 1 which is in communication through a plurality of apertures 1a with regenerating fluid such as brine solution 2 (FIG. 5) in a brine tank 3. The valve apparatus includes a valve conduit or passage 4 which may suitably be made of plastic and which has a lower end 5 in communication with the brine in the tank through a slot 5a and which has an upper end 6 extending externally of the tank and adapted to receive external piping connections. The valve conduit 4 includes an upper seat 7 and a lower seat 8 in confronting vertically spaced relation. A soft lift valve element 9 is adapted to be selectively raised or lowered in a manner described more fully hereinafter in order to seat alternately against either the upper valve seat 7 or the lower valve seat 8.

The valve apparatus contains two floats for automatically controlling the raising or lowering of the valve element in response to the level of the liquid in the tanks 1 and 3. More specifically, a valve actuating or main float 10 is connected to raise the valve element 9 against the lower side of the upper seat 7 when the float is in a fully lowered position (as illustrated in FIGS. 3 and 4) and is further adapted to lower the valve element 9 against the upper side of the lower valve seat 8 when the float is buoyed upwardly by the brine solution (as illustrated in FIGS. 1 and 2). The valve element actuating mechanism includes an actuating lever 11 fulcrumed at an intermediate point about a fixed pin 12 secured within the lower end of the conduit 4. One end of the lever 11 is connected through a rod 13 to the main float whereby the lever is rocked about the pin 12 in response to raising or lowering the main float. The other end of the lever 11 raises and lowers the valve element 9 through a valve actuating link 14 connected to a valve stem 15. When the float 10 is buoyed upwardly to its uppermost position by the high level of the brine solution 2, the valve element 9 is biased downwardly against the valve seat 8.

As is best shown in FIGS. 2 and 3, a second normally submerged float 16 is connected to restrain the full downward movement of the float 10 until such time as the brine solution 2 in the tank 3 has reached a sufficiently low predetermined level as will be evident as the description proceeds. To this end, the float 16 is secured to one end of a float rod 17 mounted for pivotal movement about a stationary pin or screw 18 which is secured to the lower end of the conduit 4. The float rod 17 contains a first stop 17a, a second stop 17b, and a third stop 17c. As more clearly seen in FIG. 1, when float 16 is buoyed upwardly by high level of the brine solution 2, the lever 11 is positioned above and is spaced from the stop 17a of the float rod 17. As the main float 10 is lowered due to the discharge of brine solution from the tank, the lever 11 is lowered into engagement with the stop 17a which prevents the further downward movement of main flaot 10. The main float 10, lever 11, and valve element 9 have now assumed the position illustrated in phantom in FIGS. 1 and 2 with the valve element 9 disengaged from both the valve seats 7, 8 and with the second float 16 still fully submerged. As the brine solution 2 in the tank continues to be discharged, in a manner hereinafter more fully described, the brine solution level will eventually reach a low point where the float 16 floats on the surface of the solution and the float 16 will move downwardly to the position shown in solid in FIG. 3, moving the stop 17a out of the path of the lever 11. The float 10 is now released and drops downwardly raising the valve element 9 against the upper valve seat 7.

The stop 17c of the float rod 17 now engages the side of the lever 11. As fluid begins to fill the tank, the float 16 cannot rise because of the interference with the movement of the float rod 17 by the lever 11. However, when the level of fluid in the tank 3 reaches a sufficient height to raise the main float 10 sufficiently so that the lever 11 is raised clear of the stop 17c, the float 16 is free to move upwardly to its high position.

Another feature of the instant invention is the inclusion of a restriction valve 19 in the brine conduit 4. The restriction valve 19 is a flat washer 19a which may be of plastic and in one preferred embodiment has a narrow rib 19b across its top and a small hole 19c drilled in one side. The restriction valve 19 is adapted to raise or lower against an upper restriction seat 20 and a lower restriction seat 20a arranged in confronting vertically spaced relation, as hereinafter more fully described.

Referring now to FIG. 5, the operation of the improved valve apparatus will be described in connection with a typical manually operated regenerating water softening system. A typical water softening installation includes an ion exchange or softening tank 33 containing an ion exchange material or mineral such as an ion exchange resin or a natural or artificial zeolite through which the water to be softened is passed. A supply line 21 is connected to discharge incoming or hard water through an inlet line 22 into the bottom of the tank 33. The softened water is removed from the tank 33 through a utility line 26. The supply line 21 is also connected to discharge flushing or regenerating water into the bottom of the tank 33 through an ejector 23 and through lines 24 and 25. A drain or flushing line 27 also extends from the top of tank 33. A valve 28 connects the supply line 21 with the inlet line 22. A second valve 29 connects the supply line 21 with the ejector 23. Another valve 30 is connected in drain line 27. The upper end 6 of the valve conduit 4 is connected to the ejector 23 through a brine conduit 31 and a valve 32. As is well known, the ejector is connected so that when water is passed through the ejector by means of lines 24 and 25 a venturi effect is established to draw fluid through the brine conduit 31 leading from the top of the valve conduit 4.

During normal operation, the water is supplied through the supply line 21 and inlet line 22, then passes through the ion exchange material in the tank 33 and is discharged through the utility line 26. The valve 28 connecting the supply line 21 to the inlet line 22 is, of course, opened. The valve 29 connecting the supply line with the ejector, the valve 30 in the drain line 27, and the valve 32 on top of the brine tank 3 are all closed. When it is desired to regenerate the ion exchange material by the passage of brine therethrough, the valve 28 is closed and the valves 29, 30 and 32 are opened. The brine tank 3 is, of course, full of brine. Water now flows from the supply line 21 to the ejector 23 and through the line 25 into the bottom of tank 33 to create a vacuum in the ejector 23. With the main float 10 in its high or tank full position (FIGS. 1 and 2) the vacuum in the ejector 23 is exerted against the valve element 9 and is sufficient to pull the soft rubber valve element 9 away from the seat 8 and to draw brine around the valve element into the brine conduit 31. During the drawing of the brine solution from the brine tank 3, the restriction valve 19 rises with the brine solution until the rib 19b hits the upper restriction seat 20 holding the washer 19a away from the upper restriction seat 20, as shown in phantom in FIGS. 1 and 2. The brine flows freely around the restriction valve 19.

The brine reaches the ejector 23, mixes with the water from the supply line 21, and flows into the bottom of the tank 33 through conduit 25 whereupon the brine and water mixture passes through the ion exchange material, and is discharged through the drain line 27. As is well known, the brine and water mixture is effective to cleanse and rejuvenate the ion exchange material in the tank 33. As the level of brine solution in the tank 1 drops, the main float 10 lowers slightly until the lever 11 rests on the stop 17a of the float rod 17. The level of the brine solution continues to drop until the float 16, which has been submerged and is holding the float stop 17a in position due to its buoyancy, begins to float upon the brine level and lowers sufficiently to permit the lever 11 to slip off the stop 17a. The full weight of the main float 10 and the rod 13 now pushes the valve element 9 upwardly with the vacuum pulling the valve element tightly against the upper seat 7, thereby shutting off the brine before it reaches the lower end 5 of the valve tube 4, thereby preventing any floating matter, such as hair or other debris, from entering the system and causing blockage and leaks. The flushing continues without the brine so that the clear supply of water from the supply line 21 is passed through the ion exchange minerals in the softening tank 33 in order to wash out the salt.

When the flushing is completed, the valve 29 to the ejector 23 is closed and the valve 30 in the drain line 27 is also closed. The valve 28 to the inlet line 22 is opened and the valve 32 in the brine conduit 31 is left open. Water now re-enters the softening tank 33 through the inlet line 22. Water pressure in the tank 33 causes water to flow into the bottom of the ejector conduit 25 and upwardly through the ejector 23 into the valve conduit 4 through the brine conduit 31 and the valve 32. The water pressure forces the valve element 9 away from the upper seat 7 to permit the water to pass around the valve element in order to refill the brine tank 3. The pressure of the incoming water holds the restriction valve 19 down against the lower restriction seat 20a. Incoming water therefore passes through the small hole 19c against the top of the valve diaphragm 9 at a reduced pressure, thereby permitting operation of the system at high pressure levels. Since the pressure drop through the hole 19c tends to be a maximum when the pressure is greatest and the flow through the opening is largest, the restriction valve tends to reduce the possible pressure variation encountered by the valve element 9 when subjected to different water pressures. The float 16 is prevented from rinsing with the water because the stop 17c of the float rod 17 is positioned against the side of the lever 11. As the float 10 rises, the lever 11 moves away from stop 17c to permit the float 16 to rise. The stop 17a then comes into position below the lever 11. When the water in the brine tank 3 reaches its full position, the buoyancy of the float 10 causes the valve element 9 to seat against the valve seat 8, thereby shutting off the flow of water. The regenerating cycle has been completed and the valve 32 may be closed if desired.

FIGS. 6 to 10 illustrate another embodiment of the new and improved apparatus for controlling the flow of fluid into and out of the brine tank of a water softening system during the regeneration of the ion exchange material according to the instant invention. The valve apparatus is disposed in a valve chamber 101 which is in communication through a plurality of apertures 101a with a brine solution (as illustrated in FIG. 5) in a brine tank 103 and includes a valve conduit or passage 104 which may suitably be made of plastic and which has a lower end 105 in communication with the brine in the tank 103 and which has an upper end 106 extending externally of the tank and adapted to receive external piping connections (not shown). The valve conduit 104 includes an upper seat 107 and a lower seat 108 in confronting vertically spaced relation. A soft rubber lift valve element 109 is adapted to be selectively raised or lowered in a manner described more fully hereinafter in order to seat alternately either against the upper valve seat 107 or the lower valve seat 108.

The valve apparatus contains two floats for automatically controlling the raising or lowering of the diaphragm valve 109 in response to the level of the liquid in the tank. More specifically, a valve element actuating or main float 110 is connected to raise the valve element 109 against the lower side of the upper seat 107 when the float 110 is in a fully lowered position (as illustrated in FIG. 8) and is further adapted to lower the valve diaphragm 109 against the upper side of the lower seat 108 when the float 110 is buoyed upwardly by the brine solution, as illustrated in FIG. 6. The valve diaphragm actuating mechanism includes an actuating lever 111 fulcrumed at an intermediate point about a fixed pin 112 secured within a U shaped extension 140 at the lower end 105 of the conduit 104. One end of the lever 111 is connected through a second lever or differential positioning lever member 141 and a rod 113 to the main float 110 whereby the lever 111 is pivoted about the fixed pin 12 in response to raising or lowering of the main float. Specifically, the differential positioning lever member 141 is of general V or angular shape, herein shown as substantially a right angle, and has its vertex or pivot 141c pivotally secured to one end of lever 111 by a pin or rivet 142. The lower end of rod 113 is pivotally secured to one end or leg 141a of the lever member 141. The other end of the lever 111 raises and lowers the valve element 109 through a valve actuating link or valve stem 114. When the float 110 is buoyed upwardly to its uppermost position by the high level of the brine solution, as illustrated in FIG. 6, the valve element 109 is biased downwardly against the upper side of the lower valve seat 108.

A second normally submerged float 116 is connected through a float rod 117 to another end or leg 141b of lever member 141 to restrain the full downward movement of the main float 110 until such time as the brine solution in the tank has reached a sufficiently low predetermined level. The float rod 117 is mounted for pivotal movement relative to the leg 141b of the lever member 141. The float rod 117 passes through the float 116 and contains a stop 143 near its upper end which is adapted to abut against a stationary portion 144 of the valve to thereby limit the upward travel of the float 116.

As best seen in FIG. 10, the rod 113 which is secured to the main float 110 has its lower end bent approximately horizontally and extending over the lever 111 in order to form a stop 113a on the rod 113 which abuts against the lever 111 when the main float 110 is in a lowered position. The rotation of the lever member 141 counterclockwise until the stop 113a strikes the lever 111 effectively moves the pivot point of the rod 113 and the lever 111 toward the pin 112 about which lever 111 pivots, thereby reducing the mechanical advantage of the lever 111 with respect to the main float 110. The main float 110, therefore does not exert sufficient force on the lever 111 to further move the lever against the upward bias exerted on it through the lever member 141 by the second, fully submerged float 116. In this manner, the float 116, acting through lever member 141, prevents the full downward travel of the main float 110 until such time as the fluid in the tank reaches a selected low level and the float 116 floats on the surface of the receding fluid level, thereby permitting additional movement of the lever 111 by the combined action of the main float 110 and the second float 116. Such added movement of the lever 111 forces the soft valve element 109 against the lower side of the upper valve seat 107 and shuts off the withdrawal of fluid from the valve conduit or passage 104.

In operation, the valve can assume the three positions represented in FIGS. 6, 7 and 8, respectively. With the brine tank 103 full, so that the brine level is high, floats 110 and 116 are buoyed upwardly; the main float 110 floats on the surface of the brine solution and the second float 116 is fully submerged. Since both floats are buoyed upwardly, the valve element 109 is against the upper side of the lower seat 108. When a vacuum is applied to the upper end 106 of the valve conduit 104, as heretofore described in connection with a typical regenerating water softening system, the vacuum is exerted against the valve element 109 and is sufficient to pull the soft rubber valve element 109 away from the seat 108 and to draw brine around the valve element into the water softener. As the level of the brine solution drops, the main float 110 lowers until the stop 113a on rod 113 is restricted from further travel by contact with rod 111. The buoyancy of float 116 will bias leg 141b of lever member 141 upwardly. The valve now assumes the position illustrated in FIG. 7; the valve element 109 is in a position between the upper seat 107 and lower seat 108 and offers no effective resistance to the withdrawal of brine through the valve conduit 104.

As the level of brine solution continues to drop, the second float 116, which has been submerged and prevents the downward movement of the first float due to its upward bias on lever member 141 and due to the engagement of stop 113a with the lever 111, now floats upon the brine and further withdrawal of brine from a selected low level lowers the float 116 sufficiently to permit the valve 110 to be lowered to its lowermost position, thereby moving the valve 109 upwardly against the lower side of the upper seat 107 and closing off the valve with respect to removal of brine therefrom, as illustrated in FIG. 8.

When the flushing of the softening tank is completed, as heretofore described, water is connected to fill the brine tank through the valve conduit 104. The water is introduced through the upper end 106 and the pressure thereof forces the soft rubber valve element 109 away from the upper seat 107 sufficiently to permit the water to pass around the valve element in order to refill the brine tank. As the level of water in the brine tank rises, the float 116 floats at the top of the fluid in the brine tank until the float 116 is prevented from further upward travel by the stop 143 engaging the stationary portion 144. The valve 109 then assumes the intermediate position illustrated in FIG. 7. Water continues to be introduced around the valve 109, substantially unrestricted by the valve 109, and continues to fill the tank until the water rises to a sufficient level to raise float 110 upwardly to the position illustrated in FIG. 6, whereby the soft valve 109 is lowered against the upper side of the lower seat 108. The pressure of the water against valve 109 holds the valve 109 tightly against the lower seat 108 to effectively shut off the incoming water.

The embodiment of the valve illustrate in FIGS. 6 to 10 operates in a similar manner to that heretofore described in connection with the embodiments of FIG. 1 to 4. A restriction valve 119 can be inserted in the valve conduit or passage 104 in a chamber 145 located above the valve 109. As shown, the restriction valve 119 consists of a washer, which may be of plastic, and which is vertically movable on a shaft member 146, which may suitably be an extension of valve stem 114. The restriction valve 119 contains a bore 147 of larger diameter than the shaft member 146, thereby forming a restrictive passage through which water may enter the valve conduit 104 when the restriction valve 119 is lowered against the lower valve seat 148 during the filling of the brine tank. When brine is removed from the tank so that the fluid in the valve conduit 104 is withdrawn upwardly, the restriction valve 119 will rise with the fluid and will bear against the bottom of a second seat 149. The second seat 149, however, contains a plurality of notches 150 which permit the passage of fluid around the restriction valve 119. The valve 119 therefore functions in a manner similar to that of restriction valve 119 heretofore described.

It may be desirable for the valve actuating link to pivot with respect to the actuating lever at a point which moves near to top dead-center or over-center of the lever pivot when the valve is against the upper seat. Referring again to the embodiments of FIGS. 6 to 10, the link 114 pivots about the lever 111 about a pivot point 151 which is arranged with respect to the fixed pin 112, which is the pivot point of lever 111, away from the longitudinal center axis of lever 111 thereby causing pivot 151 to move near dead-center or slightly over-center from the pivot of fixed pin 112 when the valve 109 is in a raised position, as illustrated in FIG. 8. Such an arrangement has the advantage that the mechanical advantage of lever 111 is substantially increased so that the valve 109 cannot move as a whole downwardly due to the force of water against it; however, the pressure of filling water is sufficient to flex the soft rubber valve element 109 so as to displace the edges thereof away from the upper seat 107 sufficiently to permit the water to pass around the valve element into the brine tank 103. Any downward load on the valve 109 and link 114 is reacted by the lever 111 and float 116, as illustrated in FIG. 8. As the level in the brine tank rises, so as to raise float 116, and subsequently float 110, the pivot 151 will move away from the over-center or dead-center position and the lever 111 will move downwardly to the position illustrated in FIG. 7. The embodiment of FIGS. 1 to 4 operates in a similar manner.

While a preferred embodiment of the invention has been described by way of illustration, many modifications will occur to those skilled in the art. Therefore, it is to be understood that it is intended in the appended claims to cover all such modifications as fall within the true spirit and scope of the invention.

What is claimed as new and desired to be secured by Letters Patent of the United States is:

Apparatus for controlling the flow of brine solution from a tank during the regeneration of the ion exchange material of a water softening system, said apparatus comprising a conduit in said tank communicating at its lower end with the brine solution in said tank, a pair of confronting vertically spaced upper and lower valve seats in said conduit, a valve in said conduit between said seats and cooperating alternately with said seats, a pivotally mounted actuating lever, valve actuating means pivotally secured to said lever and operatively associated with said valve for actuating said valve selectively against said valve seats, said valve actuating means being connected to said lever at a pivot point whereby said pivot point is near dead-center with respect to the pivot point of said pivotally mounted lever and the valve when said valve is against said upper valve seat and whereby said pivot point of said valve actuating means with respect to said lever moves away from dead-center with respect to the pivot point of said lever and the valve when said valve moves away from said upper seat, a first float means in said tank, means connecting said first float means and said lever to raise said valve against said upper seat when said first float means is in a fully lowered position and to lower said valve against said lower seat when said first float means is in a raised position, and second float means operatively associated with said first float means in said tank and connected to prevent the full downward movement of said first float means until the fluid in the tank reaches a selected low level.

References Cited in the file of this patent

UNITED STATES PATENTS

| | | |
|---|---|---|
| 924,345 | Gordon | June 8, 1909 |
| 1,803,423 | Brown | May 5, 1951 |
| 2,710,018 | Wolfe | June 7, 1955 |